(12) United States Patent
Franosch et al.

(10) Patent No.: US 10,318,985 B2
(45) Date of Patent: Jun. 11, 2019

(54) DETERMINING BIDDING STRATEGIES

(71) Applicant: Google LLC, Mountain View, CA (US)

(72) Inventors: Jan-Moritz Peter Franosch, Zurich (CH); Michael Anuzis, Tokyo (JP); Wojciech W. Skut, Zurich (CH)

(73) Assignee: Google LLC, Mountain View, CA (US)

( * ) Notice: Subject to any disclaimer, the term of this patent is extended or adjusted under 35 U.S.C. 154(b) by 525 days.

(21) Appl. No.: 14/318,513

(22) Filed: Jun. 27, 2014

(65) Prior Publication Data

US 2015/0379563 A1 Dec. 31, 2015

(51) Int. Cl.
G06Q 30/02 (2012.01)
(52) U.S. Cl.
CPC ..... *G06Q 30/0247* (2013.01); *G06Q 30/0243* (2013.01); *G06Q 30/0275* (2013.01)
(58) Field of Classification Search
CPC .................................................. G06Q 30/0243
USPC ....................................................... 705/14.42
See application file for complete search history.

(56) References Cited

U.S. PATENT DOCUMENTS

| 8,473,339 | B1 | 6/2013 | McKennon et al. | |
|---|---|---|---|---|
| 9,715,699 | B1* | 7/2017 | Els | G06Q 30/0275 |
| 2008/0275757 | A1 | 11/2008 | Sharma et al. | |
| 2010/0250332 | A1* | 9/2010 | Ghosh | G06Q 30/02 |
| | | | | 705/14.41 |
| 2015/0046279 | A1* | 2/2015 | Wang | G06F 9/5027 |
| | | | | 705/26.3 |
| 2015/0066639 | A1* | 3/2015 | Knapp | G06Q 30/0275 |
| | | | | 705/14.48 |
| 2015/0317697 | A1* | 11/2015 | Samet | G06O 30/0275 |
| | | | | 705/14.43 |

OTHER PUBLICATIONS

Kenshoo [online], "Unmatched Scale through intelligence and automation," Apr. 20, 2013 [retrieved on Jun. 24, 2015]. Retrieved from the Internet: URL<https://web.archive.org/web/20130420050651/http:/www.kenshoo.com/>, 1 page.

(Continued)

*Primary Examiner* — Jamie R Kucab
(74) *Attorney, Agent, or Firm* — Fish & Richardson P.C.

(57) ABSTRACT

Methods, systems, and apparatus, including computer programs encoded on a computer storage medium, for determining bidding strategies. A method includes: identifying a campaign including one or more selection criteria and associated bids; determining a value associated with a user event associated with presentation of a campaign content item; determining one or more predicted future events based on the selection criteria and historical data; determining aggregate values based on the determined predicted future events, using the value and hypothetical bid changes; determining an interaction rate associated with the content item and a cost per event; determining a plurality of bidding strategies for the campaign, each reflecting a change in a bid associated with one or more selection criteria that optimizes the content sponsor's value; and presenting the plurality of bidding strategies to the content sponsor.

17 Claims, 6 Drawing Sheets

(56) References Cited

OTHER PUBLICATIONS

Marin Software [online], "Powerful and Easy-to-Use Tools for the Online Marketing Professional," May 13, 2013 [retrieved on Jun. 24, 2015]. Retrieved from the Internet: URL<https://web.archive.org/web/20130513095630/http:/www.marinsoftware.com/platform/overview/>, 2 pages.

Wikipedia [online], "Cost per acquisition," Sep. 24, 2013 [retrieved on Jun. 24, 2015]. Retrieved from the Internet: URL<https://web.archive.org/web/20130924021935/http:/en.wikipedia.org/wiki/Cost_per_acquisition>, 3 pages.

Wikipedia [online], "Pay per click," Jan. 15, 2013 [retrieved on Jun. 24, 2015]. Retrieved from the Internet: URL<https://web.archive.org/web/20130115224915/http:/en.wikipedia.org/wiki/Pay_per_click>, 6 pages.

* cited by examiner

DETERMINING BIDDING STRATEGIES

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in one or more methods that include a method for determining bidding strategies. The method comprises: identifying a campaign associated with a content sponsor, the campaign including one or more selection criteria and bids for the one or more selection criteria; determining a value associated with a user event associated with presentation of a content item in the campaign; determining one or more predicted future events that are projected to occur based on the selection criteria, wherein the determining is based on historical data and wherein the one or more predicted future events would result in the presentation of the content item; determining aggregate values based on the determined predicted future events, using the value and hypothetical bid changes, the hypothetical bid changes being based on historical information; determining an interaction rate associated with the content item and a cost per event; determining a plurality of bidding strategies for the campaign, each reflecting a change in a bid associated with one or more selection criteria that optimizes the content sponsor's value, including determining the plurality of bidding strategies based on the interaction rate, predicted future events, and hypothetical bids for a given strategy; and presenting the plurality of bidding strategies to the content sponsor.

In general, another innovative aspect of the subject matter described in this specification can be implemented in one or more systems. A system comprises one or more processors and one or more memory elements. The one or more memory elements include instructions that when executed cause the one or more processors to: identify a campaign associated with a content sponsor, the campaign including one or more selection criteria and bids for the one or more selection criteria; determine a value associated with a user event associated with presentation of a content item in the campaign; determine one or more predicted future events that are projected to occur based on the selection criteria, wherein the determining is based on historical data and wherein the one or more predicted future events would result in the presentation of the content item; determine aggregate values based on the determined predicted future events, using the value and hypothetical bid changes, the hypothetical bid changes being based on historical information; determine an interaction rate associated with the content item and a cost per event; determine a plurality of bidding strategies for the campaign, each reflecting a change in a bid associated with one or more selection criteria that optimizes the content sponsor's value, including determining the plurality of bidding strategies based on the interaction rate, predicted future events, and hypothetical bids for a given strategy; and present the plurality of bidding strategies to the content sponsor.

In general, another innovative aspect of the subject matter described in this specification can be embodied in computer program products. A computer program product is tangibly embodied in a computer-readable storage device and comprises instructions. The instructions, when executed by a processor, cause the processor to: identify a campaign associated with a content sponsor, the campaign including one or more selection criteria and bids for the one or more selection criteria; determine a value associated with a user event associated with presentation of a content item in the campaign; determine one or more predicted future events that are projected to occur based on the selection criteria, wherein the determining is based on historical data and wherein the one or more predicted future events would result in the presentation of the content item; determine aggregate values based on the determined predicted future events, using the value and hypothetical bid changes, the hypothetical bid changes being based on historical information; determine an interaction rate associated with the content item and a cost per event; determine a plurality of bidding strategies for the campaign, each reflecting a change in a bid associated with one or more selection criteria that optimizes the content sponsor's value, including determining the plurality of bidding strategies based on the interaction rate, predicted future events, and hypothetical bids for a given strategy; and present the plurality of bidding strategies to the content sponsor.

These and other implementations can each optionally include one or more of the following features. Determining a value can include receiving value information from the content sponsor for an interaction. The interactions can be selected from the group comprising click, conversion, impression, interaction, or engagement. Presenting the plurality of bid strategies can include presenting a profit curve including a plurality of discrete points that represent an individual bidding strategy. An input of a selection of a point on the profit curve can be received and a corresponding bidding strategy associated with the point can be provided. A goal associated with the content sponsor and for the campaign can be identified and a point on the profit curve that best satisfies the goal can be identified based on the goal and selected on the profit curve. The goal can be received from the content sponsor. The goals can be selected from the group comprising maximum profit, maximum profit at current cost, maximum profit at current return on investment, maximum value at current profit, or maximum profit under a constraint. A curve associated with the goal can be overlaid on the profit curve to locate the point. The plurality of bid strategies can include determining a first bidding strategy that reflects no bid on any selection criteria and determining a next bidding strategy that maximizes value to the content sponsor from a plurality of possible next bid strategies given an increment increase in a bid on a single criterion of the one or more selection criteria. Determination of next bid strategies can be continued by determining a next bidding strategy that maximizes value to the content sponsor from a prior bidding strategy. The predicted future event can be a click and the interaction rate can be an expected click through rate. Expected clicks based on a given bid can be estimated using the expected click through rate, and the cost per event can be a cost per click based on the given bid. The predicted future event can be a conversion, the interaction rate can be an expected conversion rate, expected conversions based on a given bid can be estimated using the expected conversion rate and an estimated number of clicks, and the cost per event can be a cost per conversion based on the given bid. Determining a plurality of bidding strategies can include determining a sequence of strategies for bidding, using the expected clicks, cost per click, and a determined value based on a sequence of bids, including determining a first strategy that represents a first bid associated with a first keyword, and a second bid associated with a second, different keyword and profit associated therewith, and a second strategy that reflects a change in either the first or second bid. Determining a plurality of bidding strategies can include determining a sequence of strategies for bidding, and using the expected conversions, cost per conversion, and a determined value based on a sequence of bids. The sequence of strategies might not include exactly one bid change for one selection criteria for each step but instead may require multiple changes on multiple selection criteria from step to step in the sequence. The content sponsor can specify a number of valuable event types which are associated with a value for the sponsor. The plurality of bidding strategies for the campaign can be the sequence of strategies that maximizes value given cost at any point or is an approximation for the sequence. The number of valuable events for each type of event for each strategy can be estimated by using historic data or simulations. The sequence of bidding strategies can be determined by changing the bids for the selection criteria and by changing one or more other campaign parameters. The other campaign parameters can be selected from the group comprising continuous parameters and discrete parameters. The sequence of bidding strategies can be presented as a list. The list can include one or more parameters describing the respective bidding strategy and/or how to implement the strategy. The sequence of bidding strategies can be presented as a graphical representation. The graphical representation can illustrate how data describing a respective strategy changes within the sequence of bidding strategies in relation to changes to one or more parameters.

Particular implementations may realize none, one or more of the following advantages. A content sponsor can be presented with an optimized bidding strategy in response to specifying a marketing objective. A plurality of bidding strategies can be presented to a content sponsor. A content sponsor can balance shorter-term goals such as short-term profit with longer-term goals such as acquisition and growth, such as in association with selecting from available bidding strategies. Value for user events can be determined based on content sponsor provided data and/or based on data stored by a content management system. One or more optimized bidding strategies can be determined for a content sponsor on one or more of an account, campaign, or content-group level. A content sponsor can decide whether to implement some or all of a suggested bidding strategy. An experiment can measure performance of implementing a bidding strategy.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A content management system can determine and present a plurality of bidding strategies, such as for a campaign, to a content sponsor associated with the campaign. For example, the content sponsor can specify a number of event types which are associated with a value for the content sponsor. The plurality of bidding strategies for the campaign can be a determined as a sequence of strategies that maximizes value given cost for the content sponsor. The number of events for each type of event for each strategy can be estimated by using historic data or simulations.

For example and in further detail, the campaign can include one or more selection criteria and associated bids. The content management system can determine a value associated with a user event (e.g., click, user interaction, activity or, conversion) associated with presentation of a content item in the campaign. The content management system can determine one or more predicted future events (e.g., future clicks, interactions, activities or conversions) that are projected to occur based on the selection criteria and historical or modeled/projected data. The content management system can determine aggregate values based on the determined future events and can determine an interaction rate and a cost per event associated with the content item. The bidding strategies to present can be determined, for example, wherein each bidding strategy reflects a change in bid associated with one or more selection criteria that optimizes content sponsor criteria (e.g., content sponsor's value). The bidding strategies can be presented, for example, as a graphical representation (e.g., a profit curve) and/or as a list of parameter values (e.g., bid changes for one or more selection criteria) to use for implementing a particular bidding strategy.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from a content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
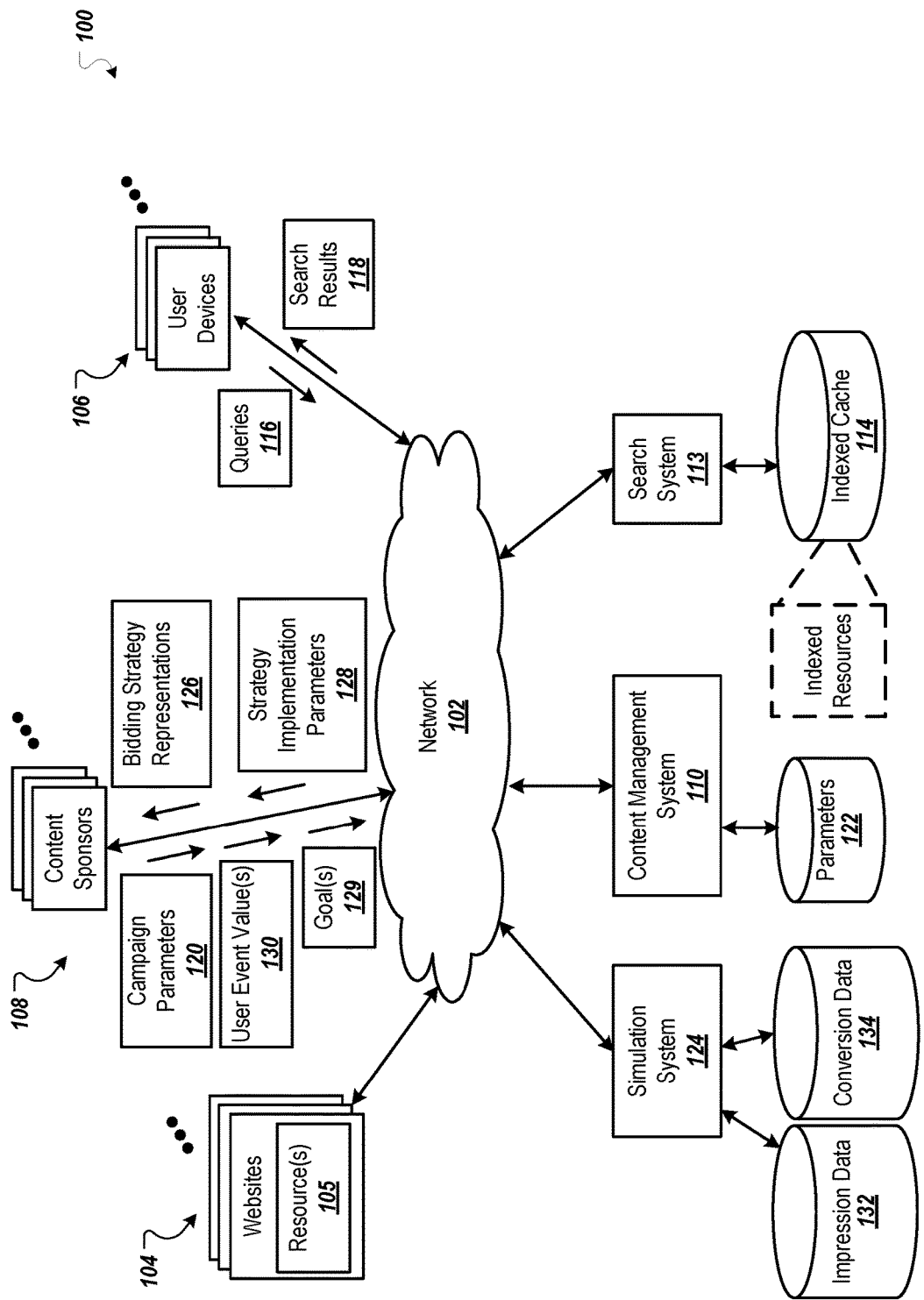
FIG. 1 is a block diagram of an example environment for providing content to a user.

FIG. 1 is a block diagram of an example environment 100 for providing content to a user device/user. The example environment 100 includes a network 102, such as a local area network (LAN), a wide area network (WAN), the Internet, or a combination thereof. The network 102 connects websites 104, user devices 106, content sponsors 108, publishers, a content management system 110, and a search system 113. The example environment 100 may include many thousands of websites 104, user devices 106, and content sponsors 108. The content management system 110 may be used for selecting and providing content in response to requests for content. The content sponsors 108 can be, for example, advertisers. Other types of content sponsors are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, applications, and news feed sources, to name only a few. The resources 105 can include content, such as words, phrases, videos, images and sounds, that may include embedded information (such as meta-information hyperlinks) and/or embedded instructions (such as scripts). A content sponsor 108 can act as a content publisher and can be associated with a website 104, and with one or more resources 105 (e.g., web pages, applications, other resources).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 113 over the network 102. In response to a search query 116, the search system 113 can, for example, access an indexed cache 114 to identify resources 105 that are relevant to the search query 116. The search system 113 identifies the resources 105 in the form of search results 118 and returns the search results 118 to the user devices 106 in search results pages. A search result 118 is data generated by the search system 113 that identifies a resource 105 that is responsive to a particular search query 116, and can include a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource 105 or a search query 116 for which search results 118 are requested can also be provided to the content management system 110 to facilitate identification of content that is relevant to the resource 105 or search query 116. An identifier (e.g., cookie) associated with the user device 106 can be received with the request for content.

Based, for example, on data included in the request for content, the content management system 110 can select content items that are eligible to be provided in response to the request. One or more selected content items can be provided to the user device 106 in association with providing an associated resource 105 or search results 118. The provided content item(s) can be presented on the user device 106, in one or more respective slots.

In some implementations, the content management system 110 can select content items based at least in part on results of an auction. For example, content sponsors 108 can provide bids specifying amounts that the content sponsors 108 are respectively willing to pay for presentation of their content items. In turn, an auction can be performed and the slots can be allocated to content sponsors 108 according, among other things, to their bids and/or the relevance of a content item to content presented on a page hosting the slot or a request that is received for the content item. For example, when a slot is being allocated in an auction, the slot can be allocated to the content sponsor 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

A content sponsor 108 or other entity can create a content campaign associated with one or more content items using tools provided by the content management system 110. For example, the content management system 110 can provide one or more account management user interfaces for creating and managing content campaigns. The account management user interfaces can be made available to the content sponsor 108, for example, either through an online interface provided by the content management system 110 or as an account management software application installed and executed locally at a content sponsor's client device.

A content sponsor 108 can, using the account management user interfaces, provide campaign parameters 120 which define a content campaign. The content campaign can be created and activated for the content sponsor 108 according to the parameters 120 specified by the content sponsor 108. The campaign parameters 120 can be stored in a parameters data store 122. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and one or more selection terms.

A content sponsor 108 can have various goals (e.g., for a campaign, for an account as a whole, or otherwise). For example, the content sponsor 108 can have a goal of maximizing profit. As another example, the content sponsor 108 can have a goal of maximizing a number of conversions or content selections (e.g., clicks). Other goals can include increasing an awareness of the content sponsor 108 (e.g., increasing awareness of a brand associated with the content sponsor 108, such as by maximizing impressions), and maximizing value or profit while under a certain constraint. A constraint can be, for example, a fixed cost (e.g., budget amount or other maximum spend amount), making a positive profit, making at least a minimum profit, or making at least a minimum return on investment. Other goals are possible.

The content sponsor 108 may not know which bids or other campaign parameters to configure to meet (or to optimally meet) some or all goals desired by the content sponsor 108. For example, the content sponsor 108 may desire to pay a certain amount for a particular user event, such as a conversion. The content management system 110 may be, for example, a pay-per-click platform which accepts payments per click but not payments per conversion. Therefore, the content sponsor 108 may not know which bids to specify to meet a particular cost-per conversion goal. As another example, when a content sponsor 108 is interested in paying a certain amount per click, the content sponsor 108 may not know what set of bids to provide to reach the cost-per-click goal.

A simulation system 124 can determine a plurality of bidding strategies for the content sponsor 108 (such as for a campaign) and can present the plurality of bidding strategies to the content sponsor 108. For example, one or more bidding strategy representations 126 can be presented to the content sponsor 108. In some implementations, the bidding strategy representation 126 is a profit curve that includes a plurality of discrete points that each represent an individual bidding strategy. As described in more detail below, in some implementations, one or more points are identified on the profit curve wherein an identified point best satisfies a particular content sponsor 108 goal. The content sponsor 108 can provide one or more goal inputs 129. In some implementations, a curve associated with a goal is overlaid onto the profit curve to locate a goal-related point.

In some implementations, the content sponsor 108 selects a particular bidding strategy and a set of strategy implementation parameters 128 is provided to the content sponsor 108. The strategy implementation parameters 128 can be, for example, a list of parameter values (e.g., one or more bid values for one or more selection criteria) that describe and/or implement the particular bidding strategy. In some implementations, the implementation parameters 128 are applied to the campaign automatically by the simulation system 124 or the content management system 110. In some implementations, the implementation parameters 128 are determined on a periodic basis (e.g., weekly, monthly) based on the goal inputs 129 and the selected bidding strategy and provided to the content sponsor 108 and/or automatically applied to the campaign.

The simulation system 124 can determine the plurality of bidding strategies based, in part, on one or more user event value inputs. For example, the content sponsor 108 can provide one or more user event value inputs 130 to the simulation system 124. A user event value input 130 can be associated with presentation of a content item in the campaign. The user event value inputs 130 can include, for example, one or more content sponsor 108 specified values for clicks, conversions, impressions, interactions, activities or engagements. In some implementations, one or more user event values can be received from another system, or determined based on one or more sources of historical or modeled data.

The simulation system 124 can determine one or more predicted future events (e.g., clicks, interactions, activities or conversions) that are projected to occur for a content item and that correspond to one or more user event value inputs 130, based on selection criteria associated with the campaign and on historical or modeled data (e.g., such as historical impression data 132 and/or historical conversion data 134). The simulation system 124 can determine aggregate values based on the determined predicted future events, using the event value inputs 130 and hypothetical bid changes. The hypothetical bid changes can be determined, for example, based on the historical impression data 132. The simulation system 124 can determine an interaction rate associated with the content item and a cost per event.

For example, as mentioned, a predicted future event can be a click or a conversion. When the predicted future event is a click, the interaction rate can be an expected click through rate. Expected clicks based on a given bid can be estimated using the expected click through rate. The cost per event can be a cost per click based on the given bid.

As another example, when the predicted future event is a conversion, the interaction rate can be an expected conversion rate. Expected conversions based on a given bid can be estimated using the expected conversion rate and an estimated number of clicks. The cost per event can be a cost per conversion based on the given bid.

When determining bidding strategies for the content sponsor 108, the simulation system 124 can determine a plurality of bidding strategies that each reflect a change in a bid associated with one or more selection criteria that optimizes a criteria (e.g., value or profit) for the content sponsor 108, based on the interaction rate, predicted future events, and hypothetical bids for a given strategy. For example and as described in more detail below, the simulation system 124 can determine the bidding strategies based on a model (e.g., equation) for profit that is based on an estimated value minus an estimated cost. As mentioned above, the determined bidding strategies can be presented to the content sponsor 108.

Figure 2:
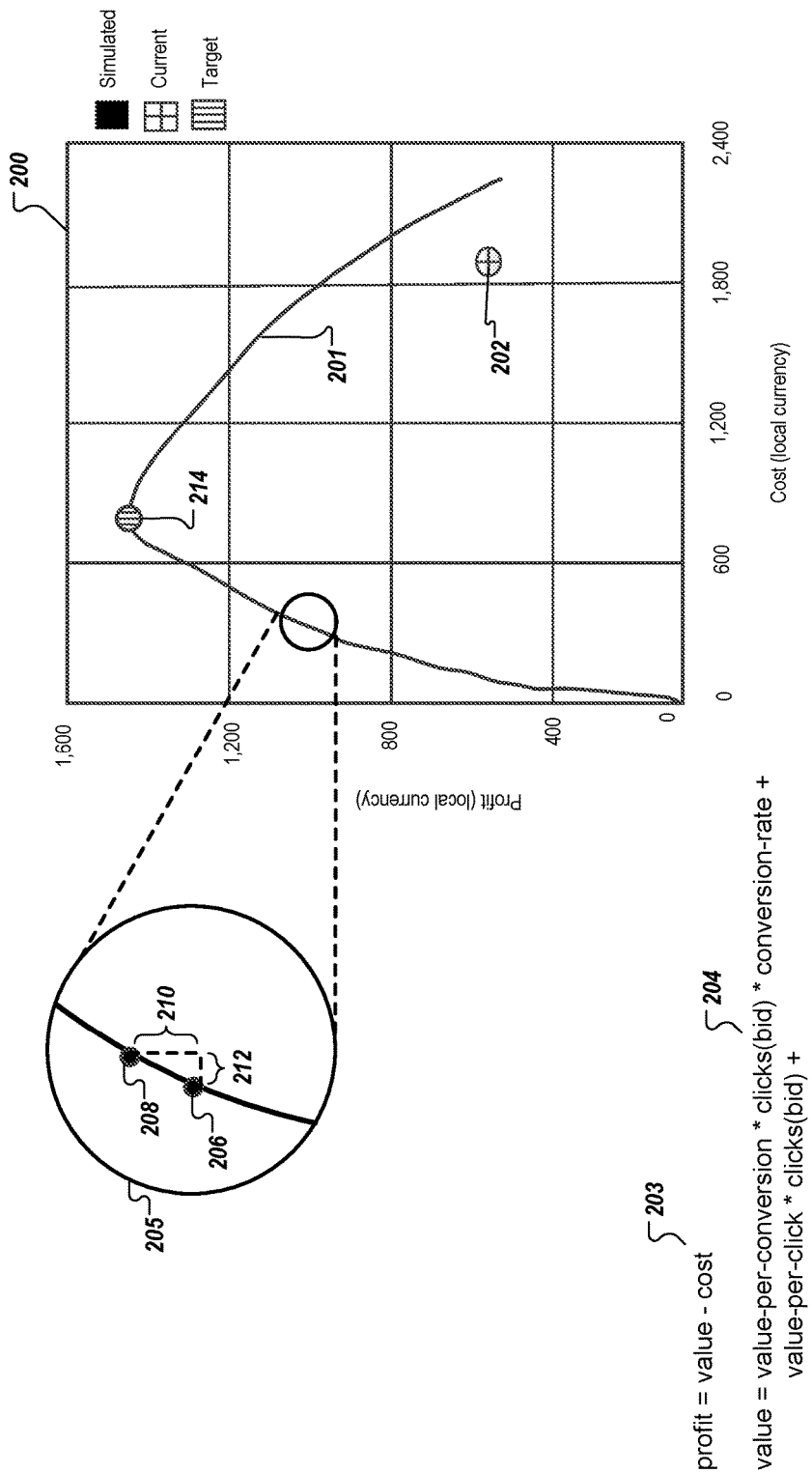
FIG. 2 illustrates an example graph which includes an example profit curve.

FIG. 2 illustrates an example graph 200 which includes an example profit curve 201. The example profit curve 201 displays, for a plurality of discrete points, a profit value for a content sponsor for a given cost value (e.g., for a campaign associated with the content sponsor). The given cost value can represent, for example, a cost to the content sponsor associated with a plurality of events (e.g., clicks, conversions). A current point 202 represents current profit at current cost for the campaign.

Profit can be determined, for example, using a formula 203 (e.g., profit=value−cost). Value can be determined, for example, using a formula 204 (e.g., value=value-per-conversion*clicks(bid)*conversion-rate+value-per-click*clicks(bid)+value-per-top-impression*top impressions(bid)). One or more of the value-per-conversion, value-per-click, or value-per-top-impression components of the formula 204 can be received, for example, from the content sponsor. A top impression is an impression that appears at a prominent position in a displayed resource, such as above search results or at a top-most position in a block of multiple content items. A top impression can increase awareness of the content sponsor's business, offers, and services.

When a value for one or more of the value-per-conversion, value-per-click, or value-per-top-impression components is not received or otherwise not known, a value for the respective component can be set to a value of zero or other value that is determined by the system. For example, a content sponsor may be interested in conversions and may place a value on (e.g., provide a value for) conversions but not for clicks or top-impressions. The clicks (bid) component represents a number of expected clicks given a particular bid. Similarly, the top-impressions (bid) component represents a number of expected top impressions given a particular bid. The conversion-rate component can be an expected conversion rate, as described above. The cost value can be determined, for example, based on a cost per click bid and an estimated number of clicks. As another example, the cost value can be determined based on a cost per acquisition bid and an estimated number of conversions.

As described above, a plurality of bidding strategies can be determined and presented to a content sponsor, such as in a profit curve such as the profit curve 201. The profit curve 201 includes a plurality of discrete points that each represent an individual bidding strategy. For example, the determination of the plurality of bid strategies can include determining a first bidding strategy that reflects no bid on any selection criteria and a next bidding strategy that maximizes value (e.g., maximizes profit) to the content sponsor from a plurality of possible next bid strategies given an increment increase in a bid on a single criterion. A content management system can, for example, generate the profit curve 201 by continuing to determine next bidding strategies by determining a next bidding strategy that maximizes value to the content sponsor from a prior bidding strategy.

For example, as shown in a blown-up portion 205 of the profit curve 201, a first point 206 represents a first bidding strategy and a second point 208 represents a second bidding strategy. Given the first point 206, the content management system can determine the second point 208 by determining an increment increase in a bid on a single criterion (e.g., a single keyword) that maximizes value to the content sponsor. For example, an increment increase in a bid on a single criterion that achieves a maximum profit increase per cost can be determined. The maximum profit increase can be illustrated in the portion 205, for example, as an increase in profit 210. The Y-value of the second point 208 can be determined, for example, by adding the increase in profit 210 to the Y-value of the first point 206. The increment increase in the bid can be reflected as an increment increase 212 in cost to the content sponsor. The X-value of the second point 208 can be determined by adding the increment increase 212 to the X-value of the first point 206.

The content management system can determine, for example, a topmost point 214 of the profit curve 201. The topmost point 214 represents a maximum profit value that can be estimated to be obtained from the campaign. The topmost point 214 can be referred to as a target point, when, for example, a goal of the content sponsor is to maximize profit. As described in more detail below, the content sponsor may have one or more goals in addition to or instead of maximizing profit.

Figure 3:
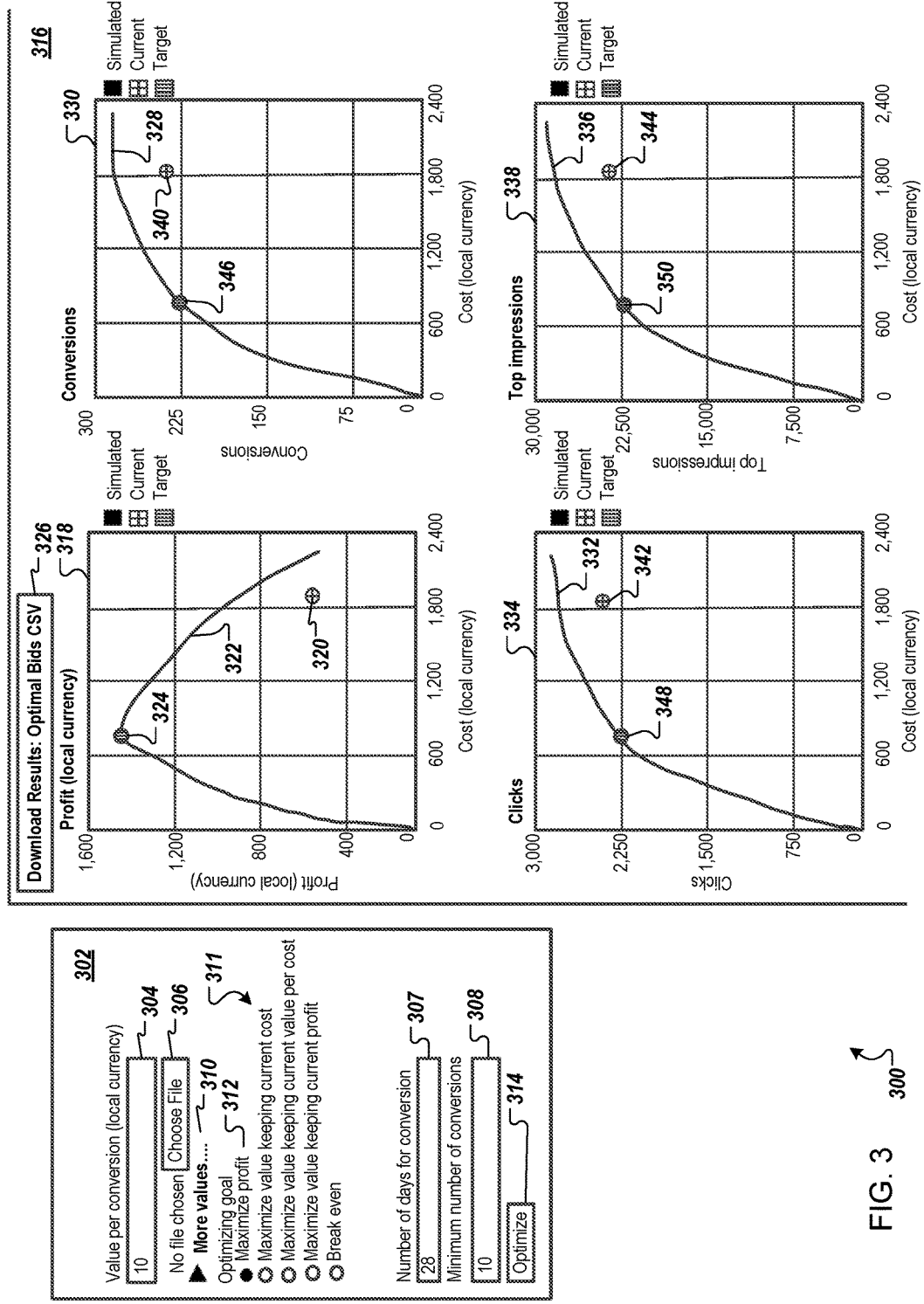
FIG. 3 illustrates an example user interface for presenting bidding strategies.

FIG. 3 illustrates an example user interface 300 for presenting bidding strategies. The user interface 300 includes an input area 302. An input control 304 can be used to enter a value per conversion. For example, a content sponsor has entered a value per conversion of ten (e.g., ten dollars). The content sponsor can select a choose-file control 306 to upload a file which contains conversion information which can be used to determine a value per conversion. A number of days for conversion input (e.g., 28 days, as shown) can be specified using an input control 307. A minimum number of conversions (e.g., 10 conversions, as shown) can be specified using an input control 308. A more-values control 310 can be selected to enable input of other values, such as a value per click and/or a value per top impression.

A set of goal controls 311 can be used to select a particular goal. For example, a maximize profit goal 312 has been selected. The set of goal controls 311 enables the content sponsor to select other goals, such as maximizing value keeping current cost, maximizing value keeping current value per cost, maximizing value keeping current profit, and breaking even (e.g., with respect to profit). In some implementations, one control of the set of goal controls 311 can be selected at a given point in time. In some implementations, two or more controls of the set of goal controls 311 can be simultaneously selected. The content sponsor can select an optimize control 314 and in response to the selection an area 316 can be updated.

For example, the area 316 includes a graph 318 which is similar to the graph 200 described above with respect to FIG. 2. For example, the graph 318 includes a point 320 which represents current profit (e.g., a profit of 500) at current cost (e.g., a cost of 1900). A profit curve 322 presents a plurality of bidding strategies that have been optimized based on the inputs specified in the input area 302. For example, the profit curve 322 includes a maximum profit point 324 which represents a maximum profit (e.g., a profit of 1480 at a cost of 760) corresponding to the selected maximize profit goal 312. The content sponsor can select a download control 326 to download a set of bids (e.g., as a "CSV" (Comma Separated Values) file) that are estimated to achieve the profit curve 322. The downloaded bids, for example, can include a set of bids (e.g., a bid vector) for a set of selection criteria associated with the campaign. In some implementations, the user interface 300 includes one or more controls that can be selected to automatically implement a bidding strategy associated with the maximum profit point 324.

In some implementations, other graphs are presented in association with the graph 318. For example, a conversions by cost curve 328 is included in a graph 330, a clicks by cost curve 332 is included in a graph 334, and a top-impressions by cost curve 336 is included in a graph 338. The graphs 330, 334, and 338 include respective points 340, 342, and 344 which illustrate current conversions given current cost, current clicks given current cost, and current top impressions given current cost, respectively.

Each graph 330, 334, and 338 includes a respective point 346, 348, or 350 on a respective curve 328, 332, or 336 which illustrates a value for a respective conversions, clicks, or top-impressions metric that is estimated to be achieved at a same cost value as the cost associated with the maximum profit point 324 (e.g., with the maximum profit point 324 corresponding to the selected maximize profit goal 312). In other words, if the content sponsor chooses to implement the bidding strategy associated with the maximum profit point 324, the content sponsor can expect to receive, at a cost of 760 (e.g., as illustrated by the X-value of the maximum profit point 324 and the points 346, 348, and 350), 225 conversions (e.g., as shown by the Y-value of the point 346), 2,250 clicks (e.g., as shown by the Y-value of the point 348), and 22,500 top impressions (e.g., as shown by the Y-value of the point 350).

When the content sponsor selects a different goal in the set of goal controls 311 and selects the optimize control 314, the area 316 can be updated accordingly. For example, one or more graphs can be displayed that correspond to the selected goal. A download control (e.g., similar to the download control 326) can be displayed that can enable the content sponsor to download a set of bids that can be used to implement a bidding strategy optimized to meet the selected goal.

In some implementations and as described in more detail below, one or more overlaid curves can be presented. For example, a curve associated with a goal can be overlaid onto a profit curve (or onto some other curve). A point on the profit curve that best satisfies the goal can be identified, such as a point that corresponds to the intersection of the goal curve and the profit curve.

Figure 4:
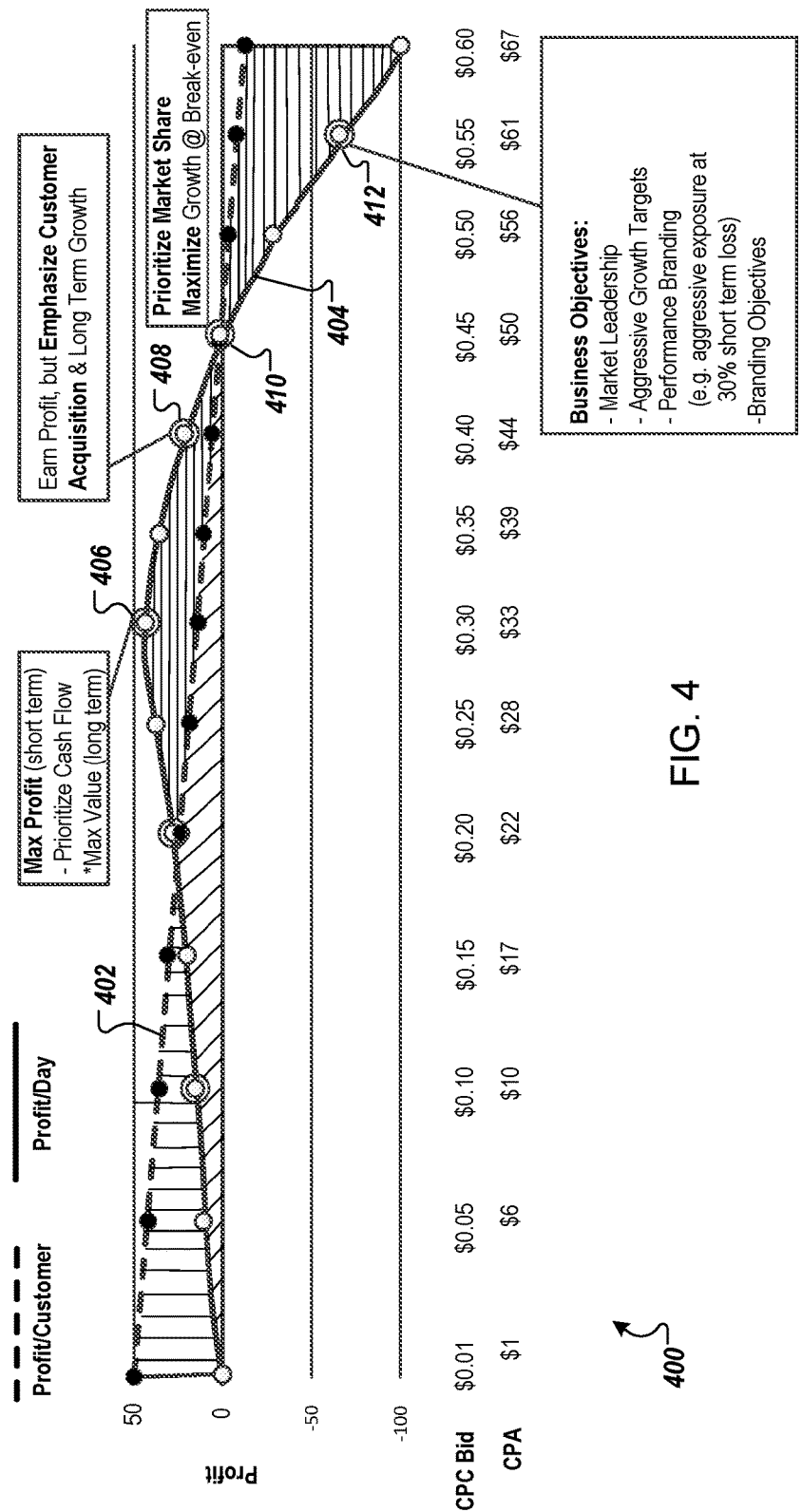
FIG. 4 illustrates an example graph which includes an example profit-per-acquisition curve overlaid onto an example profit curve.

For example, FIG. 4 illustrates an example graph 400 which includes an example profit-per-acquisition curve 402 overlaid onto an example profit curve 404. The profit-per-acquisition curve 402 displays profit per customer values given CPA (cost per acquisition) bid values. The profit curve 404 displays profit per day values given CPC (cost per click) bid values.

The content sponsor can select a point on either the profit-per-acquisition curve 402 or the profit curve 404, or a point that is an intersection of the profit-per-acquisition curve 402 and the profit curve 404. Each point can correspond to a bidding strategy that can be used to accomplish one or more business objectives. The content sponsor can select a point, for example, to be provided with a set of parameters (e.g., bid values) that can be used to implement the bidding strategy.

For example, a point 406 can correspond to maximizing profit in the short term, such as when the content sponsor provides one or more short-term related input values. As another example, the point 406 can correspond to maximizing value in the long term, such as when the content sponsor provides one or more long-term related input values (e.g., the content sponsor can factor in long-term strategic value into one or more input metrics). A short-term input value can be, for example, a short-term gross profit value for a conversion. A long-term input value can be, for example, a conversion value that is associated with an estimate of repeat business expected from a conversion, word-of-mouth gains, or some other customer lifetime value. The content sponsor can select the point 406, for example, when the content sponsor desires to maximize profit for high-margin products that are primarily sold online. As another example, the content sponsor can select the point 406 when the content sponsor desires to maximize profit on self-manufactured and/or products in high-margin categories. In some implementations, a content sponsor can provide both short-term and long-term values and choose as a goal, for example, "maximize long-term profit under the constraint of a non-negative short-term profit".

A point 408 can correspond to multiple business objectives of earning profit (e.g., a positive profit value of 24 corresponds to the point 408), customer acquisition and long-term growth. A bidding strategy associated with the point 408 can be considered to be more aggressive than a bidding strategy associated with the point 406. A content sponsor can select the point 408, for example, when the content sponsor desires to bid aggressively to compensate for conservative online to store estimates. As another example, a content sponsor can select the point 408 when the content sponsor desires to bid aggressively to drive up volume on key products, such as to achieve better rate tiers with suppliers.

A point 410 can correspond to a break-even point, such as corresponding to a goal of prioritizing market share while breaking even with regards to profit (e.g., a profit value of zero corresponds to the point 410). The point 410 is an intersection of the profit-per-acquisition curve 402 and the profit curve 404. A content sponsor can select the point 410, for example, when the content sponsor desires to break even on loss-leader product lines that may be used for long-term growth.

A point 412 can correspond to one or more of goals of market leadership, aggressive growth, or branding. For example, the content sponsor may desire to achieve aggressive exposure of a brand while taking a short-term loss with respect to profit (e.g., a profit value of negative seventy corresponds to the point 412). A content sponsor may select the point 412, for example, when the content sponsor wants to meet growth targets to unlock venture-capital funding.

Figure 5:
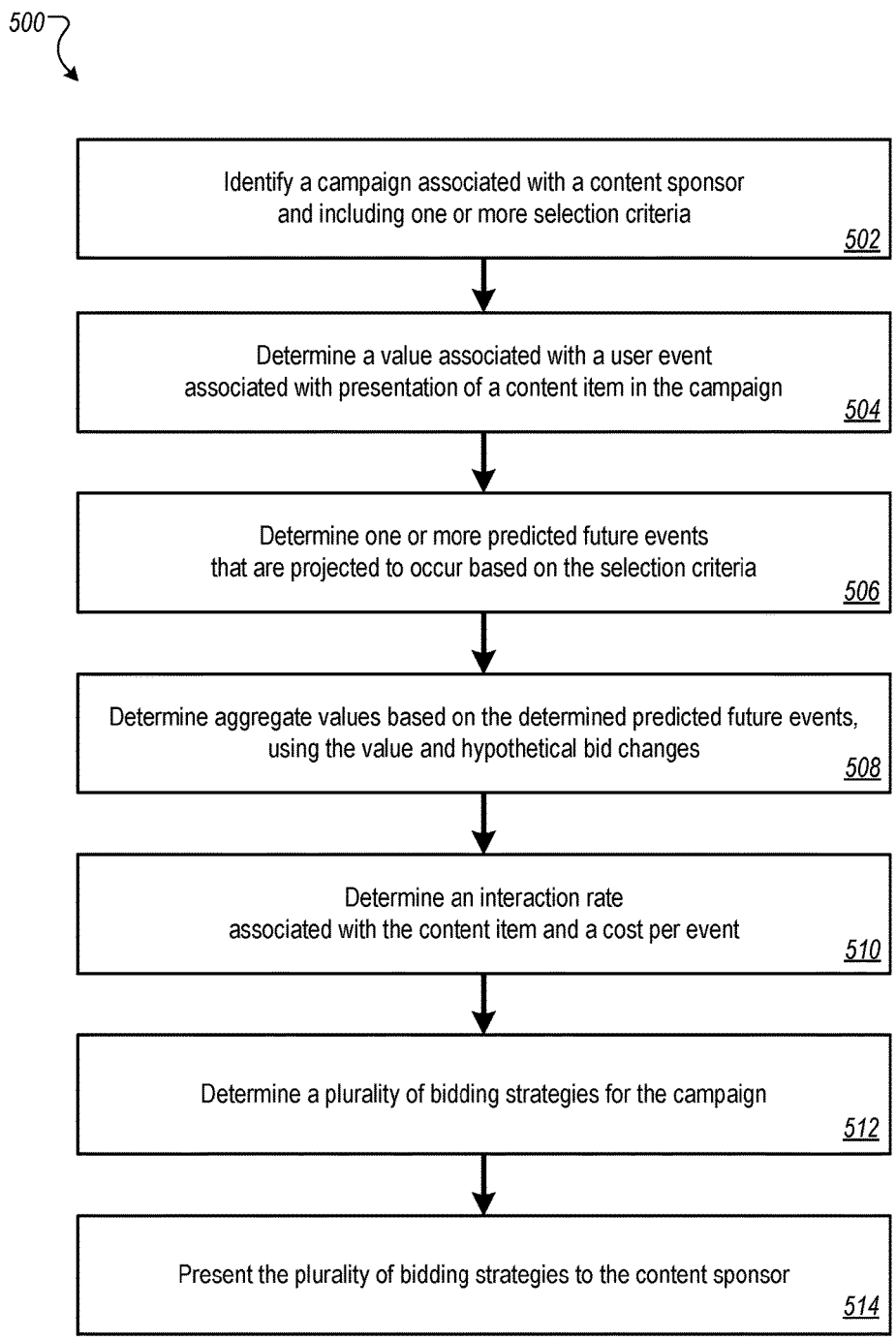
FIG. 5 is a flowchart of an example process for determining and presenting bidding strategies.

FIG. 5 is a flowchart of an example process 500 for determining and presenting bidding strategies. The process 500 can be performed, for example, by the content management system 110 and/or the simulation system 124 described above with respect to FIG. 1. Although the material below describes the identification of a campaign, in some implementations one or more other groupings of content can be identified, such as all content associated with a content sponsor, multiple campaigns (e.g., some but not all campaigns) associated with the content sponsor, or one or more content groups associated with the content sponsor.

A campaign associated with a content sponsor is identified (502), the campaign including one or more selection criteria and bids for the one or more selection criteria. The campaign can be, for example, an advertising campaign or some other type of campaign. In some implementations, the campaign is a brand campaign.

A value associated with a user event associated with presentation of a content item in the campaign is determined (504). The value associated with the user event can be received, for example, from the content sponsor. In some implementations, multiple values associated with multiple user events are received. As another example, one or more values can be received from another system, or determined based on one or more sources of historical data. The value associated with a user event can be, for example, a value associated with a type of user event. User events types can be or can include, for example, clicks, conversions, impressions, interactions, top-impressions, activities or engagements. When the user event type is a click, for example, the value for the user event can be a maximum amount that the content sponsor is willing to pay for a click. In some implementations, a content sponsor provides a first set of one or more values and/or business objectives or goals for a first set of one or more selection criteria (e.g., keywords) and a second set of one or more values and/or business objectives or goals for a second set of one or more selection criteria (e.g., keywords). A content sponsor can provide specific values for one or more keywords, for example, when the one or more keywords are strategic for the content sponsor, such as for one or more brands.

A content sponsor can provide a value per event for some or all event types. For example, suppose that the content sponsor is a hotel reservation site and that the content sponsor earns a share of each hotel reservation. The content sponsor may be interested in the number of hotel reservations (e.g., conversions) and not necessarily the number of clicks. The content sponsor can provide a value per conversion in this example and can omit providing (or provide a value of zero for) a value per click. As another example, a different content sponsor may place a value on a top impression. The content sponsor may, for example, provide a value for top-impressions but not for other user event types.

As mentioned, a value for a user event may be received from the content sponsor and/or determined in other ways. For example, a content sponsor may currently report gross revenue for each conversion to a content management system. For example, the hotel reservation site content sponsor may report user-received payments for hotel reservations. In this example, the received gross revenue values can be used to determine a value per conversion. The content sponsor can provide a booking margin value which can also be used to determine the value per conversion.

One or more predicted future events that are projected to occur are determined based on the selection criteria (506), wherein the determining is based on historical data and wherein the one or more predicted future events would result in the presentation of the content item. The one or more predicted events can be determined, for example, using a simulation system. The predicted events can be, for example, impressions, clicks, conversions, and/or sponsor-received payments).

Aggregate values are determined based on the determined predicted future events, using the value and hypothetical bid changes, the hypothetical bid changes being based on historical information (508). For example, aggregate predicted clicks, conversions, impressions, interactions, activities or engagements for a time period can be determined. The aggregate values can represent, for example, an overall value for a set of hypothetical events.

An interaction rate associated with the content item and a cost per event is determined (510). For example, as mentioned, a predicted future event can be a click or a conversion. When the predicted future event is a click, the interaction rate can be an expected click through rate. Expected clicks based on a given bid can be estimated using the expected click through rate. The cost per event can be a cost per click based on the given bid. As another example, when the predicted future event is a conversion, the interaction rate can be an expected conversion rate. Expected conversions based on a given bid can be estimated using the expected conversion rate and an estimated number of clicks. The cost per event can be a cost per conversion based on the given bid.

A plurality of bidding strategies is determined for the campaign (512), each reflecting a change in a bid associated with one or more selection criteria that optimizes the content sponsor's value, including determining the plurality of bidding strategies based on the interaction rate, predicted future events, and hypothetical bids for a given strategy.

When the predicted user event is a click (or when the predicted user events include clicks), a sequence of strategies for bidding can be determined, using the expected clicks, cost per click, and a determined value based on a sequence of bids. For example, a first strategy can be determined that represents a first bid associated with a first keyword and a second bid associated with a second, different keyword. An associated profit can be determined based on the first and second bids. A second strategy can be determined that reflects a change in either the first or second bid (e.g., a bid change that results in a maximum increase in profit can be determined). In some implementations, the sequence of strategies does not include exactly one bid change for one selection criteria for each step but instead requires multiple changes on multiple selection criteria from step to step in the sequence (e.g., the second strategy can reflect a change in both the first and second bid).

As another example, when the predicted user event is a conversion (or when the predicted user events include conversions), a sequence of bidding strategies can be determined, using the expected conversions, cost per conversion, and a determined value based on a sequence of bids. The sequence of bidding strategies can be determined, for example, by changing the bids for the selection criteria, as described above. As another example, the sequence of bidding strategies can be determined by changing the bids for the selection criteria and by changing one or more other campaign parameters (e.g., continuous and/or discrete parameters). Discrete parameters can include, for example, device-related selection criteria (e.g., mobile, tablet, desktop), geographical regions, day of week, "match type" (e.g. whether a content sponsor specifies selection criteria that matches a keyword exactly or as a phrase), or whether to include or exclude a certain keyword. Continuous parameters can include bids, bid multipliers (e.g. dependent on device, region), cost per conversion targets, and return on investment targets (e.g., a content management system can enable specification of cost per conversion and/or return on investment targets and can set keyword bids accordingly and automatically).

In some implementations, a first bidding strategy can be determined that reflects no bid on any selection criteria and a next bidding strategy can be determined that maximizes value to the content sponsor from a plurality of possible next bid strategies given an increment increase in a bid on a single criterion. A content management system can, for example, continue to determine next bid strategies by determining a next bidding strategy that maximizes value to the content sponsor from a prior bidding strategy.

The determining of next bidding strategies can continue, for example, until a stopping condition is reached. The stopping condition can correspond, for example, to a situation in which an increase of a bid does not result in a change to a user-event metric, such as clicks. For example, when a bid is continually increased, at some point a particular bid represents a situation in which the content item of the content sponsor generally will always win the auction and be presented in a top position and in which case a higher bid will not result in a higher amount of clicks. As another example, a stopping condition can be associated with a maximum bid or maximum spend amount.

As another example of determining bidding strategies, possible value and cost increases resulting from possible changes to a prior bidding strategy can be determined, wherein the possible changes can include various options of incrementing a bid to a next level. The next level can be, for example, a next level for which estimated user events have been determined (e.g., an estimated value for the content sponsor can be determined based on the estimated user events). In some implementations, from the various possible changes, a change that maximizes a ratio of the corresponding value change to the corresponding cost change can be identified as the next bidding strategy. The change that is identified, for example, can represent a steepest ascent for a next point in a profit curve, resulting in maximizing profit at each point. Such an approach can be repeated to create the plurality of bidding strategies, with the plurality of bidding strategies being a sequence of value-maximizing bidding strategies.

The plurality of bidding strategies is presented to the content sponsor (514). For example, in some implementations, a profit curve is presented that includes a plurality of discrete points that represent an individual bidding strategy. The profit curve can illustrate, for example, profit based on cost. Other curves can be presented, such as one or more curves that present, for example, conversions based on cost, clicks based on cost, or top impressions based on cost.

In some implementations, a goal (e.g., for the campaign) associated with the content sponsor is identified. For example, the goal or an indication of the goal can be received from the content sponsor. Goals can include, for example, maximum profit, maximum profit at current cost, maximum profit at current return on investment, maximum value at current profit, or maximum profit under a constraint. A point on the profit curve that best satisfies the goal can be selected. For example, the content sponsor can select the point. As another example, the point can be identified based on the goal. For example, a curve associated with the goal can be overlaid on the profit curve to locate the point. Overlaying a goal curve onto a profit curve can show the effect on a value of a metric other than profit given a particular profit value. The particular profit value can be zero (e.g., a break-even point), a maximum profit amount, or some other profit amount.

Other goals can be received or otherwise identified. For example, the content sponsor can define a custom goal which is based on one or more rules. A rule can indicate, for example, a particular strategy to pursue when a certain criteria is met. For example, a custom goal can be to first achieve an overall profit of a certain dollar amount for the content sponsor's account and afterwards pursue a goal of customer acquisitions (e.g., maximizing conversions). As another example, a custom goal can be to maximize profit while keeping a number of conversions under a certain number. For example, a small or mid-sized business may be able to process a maximum of X customers in a given time frame. As another example, a custom goal can be to achieve a minimum number of conversions in each geographic region in a set of geographic regions, possibly at a loss, with a loss not to exceed Y dollars.

In some implementations, a user input control can be presented to a content sponsor which enables the content sponsor to specify a prioritization or weighting relative to different goals. For example, a slider control can be presented that allows the content sponsor to select from a continuous set of points that may begin, for example, with a point associated with maximizing profit and end with a point associated with breaking even with respect to profit.

Figure 6:
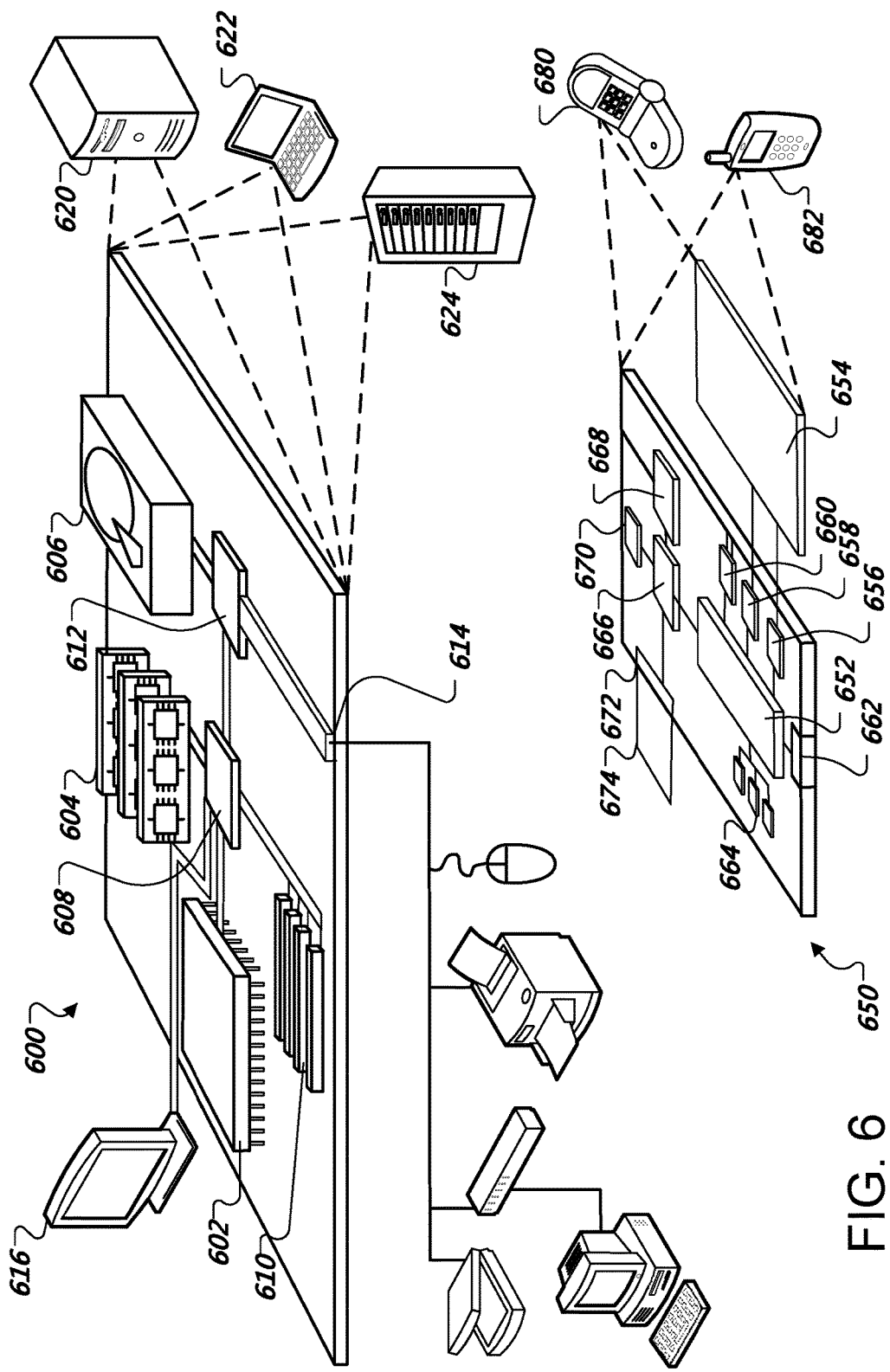
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. The computer-readable medium is not a propagating signal. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is illustrative only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer-or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube)

or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
   identifying a campaign associated with a content sponsor, the campaign including one or more selection criteria and bids for the one or more selection criteria;
   determining a value associated with a user event associated with presentation of a content item in the campaign;
   determining one or more predicted future events that are projected to occur based on the one or more selection criteria, wherein the determining is based on historical data and wherein the one or more predicted future events would result in the presentation of the content item;
   determining aggregate events based on the determined predicted future events, using the value and hypothetical bid changes, the hypothetical bid changes being based on historical information;
   determining an interaction rate associated with the content item and a cost per event;
   determining a plurality of bidding strategies for the campaign, each reflecting a change in a given bid associated with a given one or more selection criteria that optimizes a content sponsor's value, including determining the plurality of bidding strategies based on the interaction rate, predicted future events, and hypothetical bids for a given strategy;
   generating a graphical user interface that presents the plurality of bidding strategies to the content sponsor including:
      graphically presenting, in the graphical user interface, a profit curve including a plurality of discrete points that each represent profit for a different individual bidding strategy; and
      receiving, through a set of goal controls presented in the graphical user interface, a goal specified by the content sponsor;
      generating and overlaying, onto the profit curve in the graphical user interface, (i) a goal curve generated based on the goal and (ii) a visual indication of an intersection point of the profit curve and the goal curve;
   receiving, from the content sponsor, selection of the intersection point through interaction with the graphical user interface; and
   outputting, to the content sponsor and in response to the selection of the intersection point, a set of campaign parameters that implement the individual bidding strategy that is represented by the discrete point on the profit curve that is located at the intersection point.

2. The method of claim 1 wherein determining the value includes receiving value information from the content sponsor for an interaction, wherein the interaction is selected from the group comprising click, conversion, impression, or engagement.

3. The method of claim 1 wherein the goal is one of maximum profit, maximum profit at current cost, maximum profit at current return on investment, maximum value at current profit, or maximum profit under a constraint.

4. The method of claim 1 wherein determining the plurality of bid strategies includes determining a first bidding strategy that reflects no bid on any selection criteria and determining a next bidding strategy that maximizes value to the content sponsor from a plurality of possible next bid strategies given an increment increase in a bid on a single criterion of the one or more selection criteria.

5. The method of claim 4 further comprising continuing to determine next bid strategies by determining a next bidding strategy that maximizes value to the content sponsor from a prior bidding strategy.

6. The method of claim 1 wherein the predicted future event is a click, the interaction rate is an expected click through rate, expected clicks based on a given bid are estimated using the expected click through rate, and the cost per event is a cost per click based on the given bid.

7. The method of claim 1 wherein the predicted future event is a conversion, the interaction rate is an expected conversion rate, expected conversions based on a given bid are estimated using the expected conversion rate and an estimated number of clicks, and the cost per event is a cost per conversion based on the given bid.

8. The method of claim 6 wherein determining the plurality of bidding strategies includes determining a sequence of strategies for bidding, using the expected clicks, cost per click, and a determined value based on a sequence of bids, including determining a first strategy that represents a first bid associated with a first keyword, and a second bid associated with a second, different keyword and profit associated therewith, and a second strategy that reflects a change in either the first or second bid.

9. The method of claim 8 wherein determining the plurality of bidding strategies includes determining a sequence of strategies for bidding, and using the expected conversions, cost per conversion, and a determined value based on a sequence of bids.

10. The method of claim 9 wherein the sequence of strategies does not include exactly one bid change for one selection criteria for each step but instead requires multiple changes on multiple selection criteria from step to step in the sequence.

11. The method of claim 10 wherein the content sponsor specifies a number of valuable event types which are associated with a value for the sponsor, the plurality of bidding strategies for the campaign is the sequence of strategies that maximizes value given cost at any point or is an approximation for the sequence, and the number of valuable events for each type of event for each strategy is estimated by using historic data or simulations.

12. The method of claim 11 wherein the sequence of strategies is determined by changing the bids for the selection criteria and by changing one or more other campaign parameters.

13. The method of claim 12 wherein the other campaign parameters are selected from the group comprising continuous parameters and discrete parameters.

14. The method of claim 1 wherein the sequence of bidding strategies is presented as a list, the list including one or more parameters describing the respective bidding strategy and/or how to implement the strategy.

15. The method of claim 8 wherein the sequence of strategies is presented as a graphical representation, the graphical representation illustrating how data describing a respective strategy changes within the sequence of bidding strategies in relation to changes to one or more parameters.

16. A non-transitory computer-readable storage device storing instructions that, when executed by one or more processors, cause the one or more processors to:
    identify a campaign associated with a content sponsor, the campaign including one or more selection criteria and bids for the one or more selection criteria;
    determine a value associated with a user event associated with presentation of a content item in the campaign;
    determine one or more predicted future events that are projected to occur based on the one or more selection criteria, wherein the determining is based on historical data and wherein the one or more predicted future events would result in the presentation of the content item;
    determine aggregate events based on the determined predicted future events, using the value and hypothetical bid changes, the hypothetical bid changes being based on historical information;
    determine an interaction rate associated with the content item and a cost per event;
    determine a plurality of bidding strategies for the campaign, each reflecting a change in a given bid associated with a given one or more selection criteria that optimizes a content sponsor's value, including determining the plurality of bidding strategies based on the interaction rate, predicted future events, and hypothetical bids for a given strategy;
    generate a graphical user interface that presents the plurality of bidding strategies to the content sponsor including:
        graphically present, in the graphical user interface, a profit curve including a plurality of discrete points that each represent profit for a different individual bidding strategy; and
        receive, through a set of goal controls presented in the graphical user interface, a goal specified by the content sponsor;
        generate and overlay, onto the profit curve in the graphical user interface, a goal curve generated based on the goal and a visual indication of an intersection point of the profit curve and the goal curve;
    receive, from the content sponsor, selection of the intersection point through interaction with the graphical user interface; and
    output, to the content sponsor and in response to the selection of the intersection point, a set of campaign parameters that implement the individual bidding strategy that is represented by the discrete point on the profit curve that is located at the intersection point.

17. A system comprising:
one or more processors; and
one or more memory elements including instructions that when executed cause the one or more processors to:
    identify a campaign associated with a content sponsor, the campaign including one or more selection criteria and bids for the one or more selection criteria;
    determine a value associated with a user event associated with presentation of a content item in the campaign;
    determine one or more predicted future events that are projected to occur based on the one or more selection criteria, wherein the determining is based on historical data and wherein the one or more predicted future events would result in the presentation of the content item;
    determine aggregate events based on the determined predicted future events, using the value and hypothetical bid changes, the hypothetical bid changes being based on historical information;
    determine an interaction rate associated with the content item and a cost per event;
    determine a plurality of bidding strategies for the campaign, each reflecting a change in a given bid associated with a given one or more selection criteria that optimizes a content sponsor's value, including determining the plurality of bidding strategies based on the interaction rate, predicted future events, and hypothetical bids for a given strategy;
    generate a graphical user interface that presents the plurality of bidding strategies to the content sponsor including:
        graphically present, in the graphical user interface, a profit curve including a plurality of discrete points that each represent profit for a different individual bidding strategy; and
        receive, through a set of goal controls presented in the graphical user interface, a goal specified by the content sponsor;
        generate and overlay, onto the profit curve in the graphical user interface, a goal curve generated based on the goal and a visual indication of an intersection point of the profit curve and the goal curve;
    receive, from the content sponsor, selection of the intersection point through interaction with the graphical user interface; and
    output, to the content sponsor and in response to the selection of the intersection point, a set of campaign parameters that implement the individual bidding strategy that is represented by the discrete point on the profit curve that is located at the intersection point.

\* \* \* \* \*

UNITED STATES PATENT AND TRADEMARK OFFICE
CERTIFICATE OF CORRECTION

PATENT NO. : 10,318,985 B2
APPLICATION NO. : 14/318513
DATED : June 11, 2019
INVENTOR(S) : Franosch et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this
Thirty-first Day of December, 2019

Andrei Iancu
*Director of the United States Patent and Trademark Office*